UNITED STATES PATENT OFFICE.

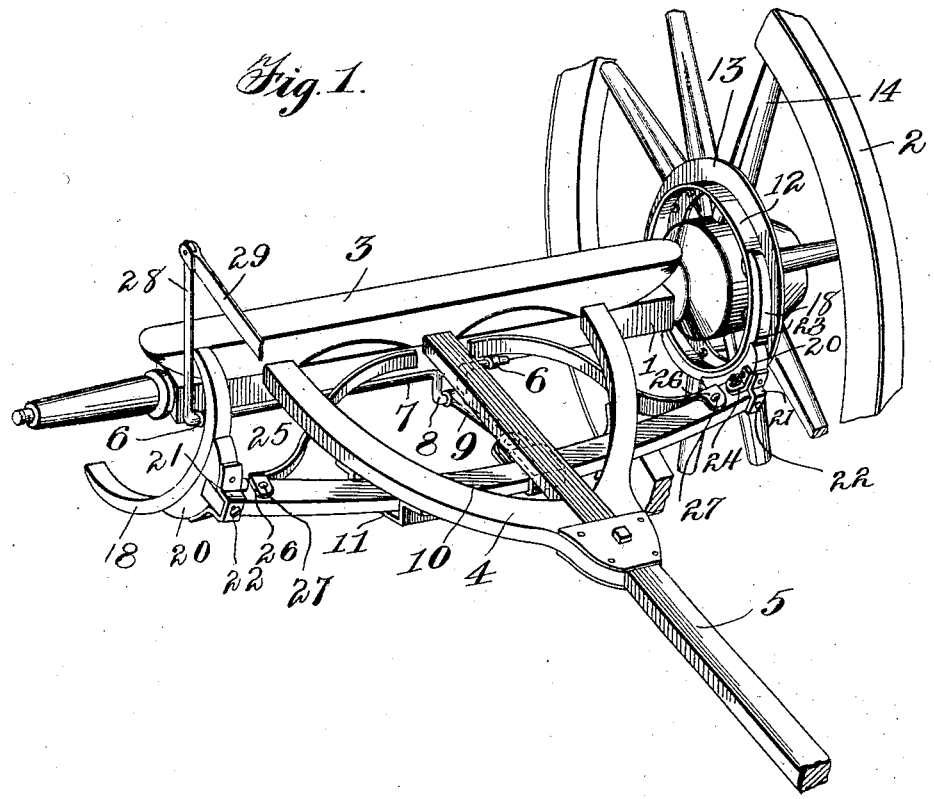

JOHN WILLIAM McILVAIN, OF CANYONCREEK, MONTANA.

VEHICLE-BRAKE.

No. 814,559.  Specification of Letters Patent.  Patented March 6, 1906.

Application filed March 21, 1905. Serial No. 251,255.

*To all whom it may concern:*

Be it known that I, JOHN WILLIAM MCILVAIN, a citizen of the United States, residing at Canyoncreek, in the county of Lewis and Clarke and State of Montana, have invented certain new and useful Improvements in Vehicle-Brakes; and I do hereby declare the following to be a full, clear, and exact description of the invention, such as will enable others skilled in the art to which it appertains to make and use the same.

My invention relates to brakes for all kinds of vehicles; and it consists of certain novel features of combination and construction of parts, the preferred form whereof will be hereinafter clearly set forth, and pointed out in the claims.

The main object of my invention is to provide a brake which will comprise but few easily and cheaply constructed parts and by means of which the same amount of friction will be applied to each of the rear wheels of the vehicle.

Other objects and advantages will be hereinafter clearly set forth, reference being had to the accompanying drawings, which are considered a part of this application, and in which—

Figure 1 shows a perspective view of my invention complete as applied to use upon a vehicle of the usual or any preferred construction. Fig. 2 is a detail view showing a section of the brake-shoe and friction-block and also showing the drum or part attached to the wheel for coöperation with the brake-shoe and friction-plate. Fig. 3 is a sectional view taken on a line with one of the spokes of the vehicle and showing how the friction-drum is secured in position upon the wheel. Fig. 4 is a detail perspective view of the shoe detached.

For convenience of description the various parts of my invention and coöperating accessories will be designated by numerals, the same numeral applying to a similar part throughout the several views, and referring to the numerals on the drawings, 1 designates the carrying-axle of the vehicle of the usual or any preferred construction, while 2 indicates the carrying-wheels thereof, and 3 the rear bolster of the wagon, to which are attached in the usual manner the hounds 4, designed to coöperate with or engage the coupling-pole 5, as is common to vehicles of this character.

Upon the forward side of the axle 1 I provide the brackets 6, and in said brackets I mount the rock-shaft 7, having the crank-arm 8, which is attached to the link member 9, the forward end of which is connected in any preferred way to the central portion of the brake-bar 10, held in position on the under side of the hound by the brackets 11 or equivalent means, whereby said brake-bar may be moved bodily forward or backward incident to the release or application of the brakes.

Upon each of the wheels I provide the friction-drum or wheel 12, preferably having an integral flange or anchoring-plate 13, which latter is bolted directly to the spokes 14 of the wheel by a plurality of hooked bolts or members 15 and locking-nuts 16, as clearly shown in Fig. 3, said bolts passing through suitable elongated apertures 17 in the base member or anchoring-flange 13, as clearly shown in Fig 2.

Designed to coöperate with and engage the peripheral face of the drum 12 is the crescent-shaped friction-plate 18, having the anchoring-lugs 19, which latter are designed to be seated in suitable recesses provided in the face of the brake-shoe proper, 20, the latter being recessed to receive the bar 10 and connected to the end of said bar 10 by the strap irons or members 21 or equivalent means, a set-screw 22 or other preferred device being employed to hold these parts together, as shown in Fig. 2. The lugs of the friction-bar 18 are held in engagement with the brake-shoe because of the close proximity of said bar to the drum 12, and lateral movement of the bar in one direction is prevented by the flange 13 of drum 12, while lateral movement of said bar in the opposite direction is prevented by a flange 23, formed at one side of the shoe 20. An ear 24 extends from each shoe and is adjustably connected to the bar 10 by a bolt, as shown.

The brake-bar 10 is held normally forward, so that the friction-plates 18 will be normally disposed out of engagement with the friction-drum 12 by means of the springs 25, the forward ends of said springs being provided with the clip-like member 26, designed to be locked in engagement with a bar, as by the rivet or bolt 27, while the free ends of said springs are slightly curved and are designed to rest against the forward side of the axle 1.

It will be observed that the rock-shaft 7 is provided at its outer end with the upwardly-extending branch 28, which is pivotally connected to the controlling-bar 29, extending to the brake-lever, (not shown,) thus placing the brake completely under the control of the operator, as a simple forward or rearward movement of the brake will be all that is required.

The various parts of my invention may be cheaply and expeditiously manufactured and each readily assembled in its respective operative place, and while I have described the preferred combination and construction of elements I desire to comprehend in this application all such substitutes and equivalents as may be considered as falling fairly within the scope and purview of my invention.

Having thus fully described the construction of my vehicle-brake, it is thought the operation thereof will be made clearly apparent, though it may be stated that when it is desired to lock the brake-shoes or friction-plates 18 in engagement with the drums 12 upon the wheels all that is necessary is to throw the controlling-lever (not shown) forward, which will draw the upper end of the branch or extension 28 forward and incidentally draw the brake-bar rearwardly, and therefore force the friction-plates 18 tightly in engagement with the friction-drums 12, it being understood that there shall be one of said friction-drums for each of the rear wheels and that they will be located upon the inner side of said wheels.

Obviously the brake may be easily released by throwing the brake-lever (not shown) rearwardly, which will release the brakes and permit the springs 25 to move the brake-shoes entirely out of engagement with the friction-drums 12, it being understood that said springs shall be so adjusted as to reliably perform their office. Inasmuch as the brake-bar is so mounted that it is left free to move bodily backward, the force or friction will be equally applied to both the wheels, thus distributing the strain upon the wheels and insuring a more perfect operation of the brake and control of the vehicle. To remove the friction-plate 18, it is first necessary to remove the wheel 2 and its drum.

Having thus fully described my invention, what I claim as new, and desire to secure by Letters Patent, is—

1. In a vehicle-brake, the combination with a rotatable device having an annular flange at one side; of a brake-shoe, a suitable support therefor, a flange extending from the shoe at one side, a friction device interposed between the shoe and rotatable device and interposed between and detached from their flanges, and means for preventing longitudinal displacement of the friction device.

2. The combination with a rotatable device adapted to be secured to a wheel of a vehicle; of a beam, a recessed shoe forming a seat for the beam, an angular strap secured to the shoe and extending over the recess, said strap surrounding the beam, means within the strap for adjustably securing the shoe to the beam, an integral flange at one side of the shoe, and a friction-plate concentric with the rotatable device and engaging the shoe and overlapped by its flange, said plate adapted to contact with, and to be held in engagement with the shoe solely by, the rotatable device.

3. The combination with wheels of a vehicle and flanged friction-drums secured thereto; of a spring-controlled brake-beam interposed between said wheels, recessed shoes constituting seats for the brake-beam, angular straps secured to said shoes and extending around the beam, means within the straps for adjustably securing the shoes to the beam, said shoes having integral flanges upon their adjoining faces, friction-plates concentric with the drums and interposed between the flanges of the shoes and drums, and means upon the plates for detachably engaging the shoes, said plates being adapted to contact with, and to be held in engagement with the shoes solely by, the drums.

4. In a vehicle-brake, the combination with a rotatable device having an annular flange at one side; of a beam, a brake-shoe secured thereto, a flange extending from the shoe, a friction-plate interposed between the shoe and the rotatable device and between their flanges, and means upon the plate for loosely engaging the shoe, said means being held in engagement with the shoe by the rotatable device upon which the friction-plate works.

In testimony whereof I have signed my name to this specification in the presence of two subscribing witnesses.

JOHN WILLIAM McILVAIN.

Witnesses:
H. YAEGER,
R. H. ANDERSON.